United States Patent
Karaaslan et al.

(10) Patent No.: US 11,893,724 B2
(45) Date of Patent: Feb. 6, 2024

(54) METHODS OF ARTIFICIAL INTELLIGENCE-ASSISTED INFRASTRUCTURE ASSESSMENT USING MIXED REALITY SYSTEMS

(71) Applicant: University of Central Florida Research Foundation, Inc., Orlando, FL (US)

(72) Inventors: Enes Karaaslan, Orlando, FL (US); Fikret Necati Catbas, Orlando, FL (US); Ulas Bagci, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 18/147,279

(22) Filed: Dec. 28, 2022

(65) Prior Publication Data

US 2023/0131469 A1 Apr. 27, 2023

Related U.S. Application Data

(62) Division of application No. 17/247,389, filed on Dec. 9, 2020, now Pat. No. 11,551,344.

(Continued)

(51) Int. Cl.
*G06T 7/00* (2017.01)
*G06F 3/01* (2006.01)
(Continued)

(52) U.S. Cl.
CPC ........ *G06T 7/0004* (2013.01); *G02B 27/0172* (2013.01); *G06F 3/011* (2013.01);
(Continued)

(58) Field of Classification Search
CPC ..... G06T 7/0004; G06T 7/11; G06T 2200/24; G06T 2207/20081; G06T 2207/30132;
(Continued)

(56) References Cited

U.S. PATENT DOCUMENTS

2019/0096135 A1  3/2019  Dal Mutto et al.
2019/0180433 A1* 6/2019  Sasson ................. G06V 20/176
(Continued)

OTHER PUBLICATIONS

Kotsiantis, S. B., Zaharakis, I., & Pintelas, P. (2007). Supervised machine learning: A review of classification techniques. Emerging artificial intelligence applications in computer engineering, 160(1), 3-24.*

(Continued)

*Primary Examiner* — Sarah Lhymn
(74) *Attorney, Agent, or Firm* — Owen G. Behrens; Smith & Hopen, P.A.

(57) ABSTRACT

A smart, human-centered technique that uses artificial intelligence and mixed reality to accelerate essential tasks of the inspectors such as defect measurement, condition assessment and data processing. For example, a bridge inspector can analyze some remote cracks located on a concrete pier, estimate their dimensional properties and perform condition assessment in real-time. The inspector can intervene in any step of the analysis/assessment and correct the operations of the artificial intelligence. Thereby, the inspector and the artificial intelligence will collaborate/communicate for improved visual inspection. This collective intelligence framework can be integrated in a mixed reality supported see-through headset or a hand-held device with the availability of sufficient hardware and sensors. Consequently, the methods reduce the inspection time and associated labor costs while ensuring reliable and objective infrastructure evaluation. Such methods offer contributions to infrastruc- (Continued)

ture inspection, maintenance, management practice, and safety for the inspection personnel.

6 Claims, 20 Drawing Sheets

Related U.S. Application Data

(60) Provisional application No. 62/945,568, filed on Dec. 9, 2019.

(51) Int. Cl.
*G06T 7/11* (2017.01)
*G02B 27/01* (2006.01)
*G06V 10/94* (2022.01)
*G06V 10/774* (2022.01)

(52) U.S. Cl.
CPC .............. *G06T 7/11* (2017.01); *G06V 10/774* (2022.01); *G06V 10/95* (2022.01); *G02B 2027/014* (2013.01); *G02B 2027/0138* (2013.01); *G02B 2027/0141* (2013.01); *G06T 2200/24* (2013.01); *G06T 2207/20081* (2013.01); *G06T 2207/30132* (2013.01); *G06T 2210/12* (2013.01)

(58) Field of Classification Search
CPC ...... G06T 2210/12; G06T 2207/20084; G02B 27/0172; G02B 2027/0138; G02B 2027/014; G02B 2027/0141; G06F 3/011; G06V 10/774; G06V 10/95
See application file for complete search history.

(56) References Cited

U.S. PATENT DOCUMENTS

| | | | |
|---|---|---|---|
| 2019/0258878 A1* | 8/2019 | Koivisto | G01S 7/417 |
| 2019/0266747 A1* | 8/2019 | Zhou | G06T 7/73 |
| 2020/0151833 A1* | 5/2020 | Bellaish | G06Q 40/03 |
| 2021/0056678 A1* | 2/2021 | Al Shehri | G06T 7/0004 |
| 2021/0081698 A1 | 3/2021 | Lindeman et al. | |
| 2021/0110527 A1* | 4/2021 | Wheaton | G06T 7/0002 |
| 2021/0125036 A1* | 4/2021 | Tremblay | G06V 10/242 |

OTHER PUBLICATIONS

Ioannis. Mixed Reality Constructs a New Frontier for Maintaining the Built Environment. Civil Engineering. 2017. Vol. 170 (Issue CE2): 53.
Moreu et al., Augmented Reality Tools for Enhanced Structural Inspection. 2017. No. 2: 3124-3130.
Yokoyama et al., Development of an Automatic Detector of Cracks in Concrete Using Machine Learning. Procedia Engineering. 2017. Vol. 171: 1250-1255.
Jahanshahi and Masri. Adaptive Vision-Based Crack Detection Using 3D Scene Reconstruction for Condition Assessment of Structures. Automation in Construction. 2012. Vol. 22: 567- 576.
Adhikari et al., Image-Based Retrieval of Concrete Crack Properties for Bridge Inspection. Automation in Construction. 2014. vol. 39: 180-194.
German et al., Rapid Entropy-Based Detection and Properties Measurement of Concrete Spalling with Machine Vision for Post-Earthquake Safety Assessments. Advanced Engineering Informatics. 2012. vol. 26 (No. 4): 846-858.
Zaurin et al., Hybrid Sensor-Camera Monitoring for Damage Detection: Case Study of a Real Bridge. Journal of Bridge Engineering. 2016. vol. 21(No. 6): 05016002.
Hiasa. Investigation of Infrared Thermography for Subsurface Damage Detection of Concrete Structures. Electronic Theses and Dissertations. 2016. Paper 5063: 1-225.
Prasanna et al., Automated Crack Detection on Concrete Bridges. IEEE Transactions on Automation Science and Engineering. 2016. vol. 13 (No. 2): 591-599.
Maeda et al., Road Damage Detection Using Deep Neural Networks with Images Captured Through a Smartphone 2015: 1-14.
Yang et al., A Robotic System towards Concrete Structure Spalling and Crack Database. 2017 IEEE International Conference on Robotics and Biomimetics (ROBIO). 2017: 1-6.
Sandler et al., MobileNetV2: Inverted Residuals and Linear Bottlenecks. IEEE/CVF Conference on Computer Vision and Pattern Recognition. 2018: 1-11.
Lalonde and Bagci. Capsules for Object Segmentation. 1st Conference on Medical Imaging with Deep Learning (MIDL 2018). 2018: 1-9.
Badrinarayanan et al., SegNet: A Deep Convolutional Encoder-Decoder Architecture for Image Segmentation. IEEE Transactions on Pattern Analysis and Machine Intelligence, vol. 39, No. 12, 2017, pp. 2481-2495.
Chen et al., 3D Pose Tracking with Multitemplate Warping and SIFT Correspondences. IEEE Transactions on Circuits and Systems for Video Technology. 2016. vol. 26 (No. 11): 2043-2055.
Marchand et al., Pose Estimation for Augmented Reality: A Hands-on Survey. IEEE Transactions on Visualization and Computer Graphics. 2016 vol. 22 (No. 12): 2633-2651.
Napolitano et al., Combination of Image-Based Documentation and Augmented Reality for Structural Health Monitoring and Building Pathology. Front. Built Environ. 2019. vol. 5: Article 50.
Golparvar-Fard et al. "D4AR-A 4-Dimensional Augmented Reality Model for Automatic Construction Progress Monitoring Data Collection, Processing and Communication" Journal of Information Technology in Construction, Jun. 2009. pp. 129-153, vol. 14.
Ferguson et al. "Detection and Segmentation of Manufacturing Defects with Convolution Neural Networks and Transfer Learning" Smart and sustainable manufacturing systems. Sep. 2018.
Redmon et al. "You Only Look Once: Unified, Real- Time Object Detection" In Proceedings of the IEEE conference on computer vision and pattern recognition, pp. 779-787.

\* cited by examiner

METHODS OF ARTIFICIAL INTELLIGENCE-ASSISTED INFRASTRUCTURE ASSESSMENT USING MIXED REALITY SYSTEMS

CROSS-REFERENCE TO RELATED APPLICATIONS

This Nonprovisional Application is a divisional of and claims the benefit of priority to U.S. patent application Ser. No. 17/247,389 entitled "METHODS OF ARTIFICIAL INTELLIGENCE-ASSISTED INFRASTRUCTURE ASSESSMENT USING MIXED REALITY SYSTEMS," filed Dec. 9, 2020, by the same inventors, which claims priority to U.S. Provisional Patent Application No. 62/945,568, entitled "METHODS OF ARTIFICIAL INTELLIGENCE-ASSISTED INFRASTRUCTURE ASSESSMENT USING MIXED REALITY SYSTEMS," filed on Dec. 9, 2019, by the same inventors, all of which are incorporated herein by reference, in their entireties, for all purposes.

BACKGROUND OF THE INVENTION

1. Field of the Invention

This invention relates, generally, to mixed reality systems used to analyze physical structures in real-time. More specifically, it relates to artificial intelligence-assisted infrastructure assessment systems using mixed reality.

2. Brief Description of the Prior Art

The use of virtual reality (VR) is well-known as a computer simulated replication of a physical or imaginary environment, with a user being able to experience and interact with the simulation through an immersive technology. Typically, VR replaces the user's physical world with a completely virtual environment and isolates the user's sensory receptors (eyes and ears) from the real, physical world [1]. The VR is observed through a system that displays the objects and allows interaction, thus creating virtual presence [2]. Nowadays, VR headsets have gained vast popularity, especially in gaming industry. Augmented reality (AR), on the other hand, is an integrated technique that typically leverages image processing, real-time computing, motion tracking, pattern recognition, image projection, and feature extraction to render a visual reality. AR overlays computer generated content onto the real world, combining real and virtual objects in a realistic environment by registering virtual objects to the real objects interactively in real time [3]. Early examples of AR date back to see-through head-mounted displays used to view 3D virtual objects, with initial prototypes being capable of rendering only a few small line objects [4]. However, AR research has recently gained dramatic improvements and now it is possible to visualize very complex virtual objects in the augmented environment.

Conventional methods for visual assessment of civil infrastructures have certain limitations, such as subjectivity of the collected data, long inspection time, and high cost of labor. Although some new technologies (i.e. robotic techniques) that are currently in practice can collect objective, quantified data, the inspector's own expertise is still critical in many instances since these technologies are not designed to work interactively with human inspector. As a result, mixed reality (MR) platforms have seen increased use, in which subject matter can be rendered from a remote location for interaction and analysis. Namely, MR technologies have been implemented via 3D user interfaces in applications including computer-aided design, radiation therapy, surgical simulation, and data visualization. [5] Specifically relating to the field of construction and maintenance, attempts have been made to implement MR, such as to inspect bridges from an office space based on field-captured images [6]. In addition, MR-based inspection tools have been used to take measurements and set benchmarks in structural inspection-based applications. [7].

However, for many construction-based applications, there remains a need to blend artificial intelligence (AI) with user inputs and decisions to improve the accuracies of analysis-based systems, such as by combining AI with MR. Some attempts have been made at utilizing a dataset to train a network in the automated detection of infrastructure anomalies. For example, Yokoyama and Matsumoto (2017) developed a convolutional neural network-(CNN-) based crack detector with 2000 training images. [8] The main challenge of the detector was that the system often classifies stains as cracks. Yet, the detection is successful for even very minor cracks. Similarly, Jahanshahi and Masri (2012) developed a crack detection algorithm that uses an adaptive method from 3D reconstructed scenes. [9]. The algorithm extracts the whole crack from its background, where the regular edge detection-based approaches just segment the crack edges. As such, the method offers a more feasible solution for crack thickness identification. Adhikari et al. (2014) used 3D visualization of crack density by projecting digital images and neural network models to predict crack depth, which is vital for condition assessment of concrete components. [10]. Moreover, for the detection of spalls and cracks, German et al. (2012) used an entropy-based thresholding algorithm in conjunction with image processing methods in template matching and morphological operations. [11].

In addition to the detection of local defects of structures, there are also studies on identifying global damages of the structures. For example, Zaurin et al. (2015) performed motion tracking algorithms to measure the mid-span deflections of bridges under the live traffic load. [12]. Computer vision is also used to process ground penetration radar (GPR) and infrared thermography (IRT) images that are useful to identify delamination formed inside the concrete structures. For example, Hiasa et al. (2016) processed the IRT images of bridge decks taken with high-speed vehicles. [13].

As is clear in the discussion above, in identifying structural damages, many different techniques are useful for specific purposes, while no singular technique or method can be used for all types of structural damage. Accordingly, what is needed is a more generalized deep learning approach so that the methods can be expanded toward identifying virtually any type of damage, so long as sufficient amount of training data is available. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

The long-standing but heretofore unfulfilled need for a generalized deep learning method to efficiently identify infrastructure defects is now met by a new, useful, and nonobvious invention.

The novel hybrid system for contactless structure inspection includes a front-end module including a mixed reality headset in communication with a user-input actuator. The mixed reality headset is configured to scan a surrounding area and capture images within the surrounding area to detect a defect in a structure disposed within the surrounding area. The user-input actuator is configured to receive a selection from a user to investigate a portion of the surrounding area. As such, the mixed reality headset captures an image of the portion of the surrounding area.

The hybrid system also includes a back-end module including a server in wireless communication with the mixed reality headset. The server includes a deep learning module having a trained data set of defects in structures, and is configured to receive the captured image of the portion of the surrounding area from the mixed reality headset. The deep learning module is configured to compare the captured image of the portion of the surrounding area with the trained data set of defects in structure to determine a presence of a defect. In an embodiment, the server is configured to segment the captured image of the portion of the surrounding area only within the bounding box, thereby focusing the comparison performed via the deep learning module on the segmented image within the bounding box.

The hybrid system is configured to implement an attention-guided technique, such that the mixed reality headset scans the surrounding area for defects to guide an investigation into one or more defects within the surrounding area. Upon receiving the selection from the user, the mixed reality headset creates a bounding box around the portion of the surrounding area, such that only the mixed reality headset transmits only the bounding box to the server for investigation.

In an embodiment, the user-input actuator includes a module configured to adjust a tolerance value of the mixed reality headset. The tolerance value is related to a size of the bounding box, such that a lower tolerance value corresponds to a larger bounding box, and such that a higher tolerance value corresponds to a smaller bounding box.

The novel method of contactless structural defect analysis includes a step of scanning an area surrounding a mixed reality headset to capture one or more images including possible defects. The mixed reality headset suggests a plurality of the one or more images for an analysis. The method includes a step of receiving, via a user-input actuator in communication with the mixed reality headset, an input from a user to investigate one of the suggested images. The mixed reality headset generates the bounding box surrounding the selected one of the suggested images to a server. The server segments the selected one of the suggested images within the bounding box. The server compares the segmented selected one of the suggested images with a plurality of images from a trained data set. Next, the server calculates a likelihood of a defect within the segmented selected one of the suggested images based on the comparison with the trained data set. The calculated likelihood of the defect is transmitted by the server to the mixed reality headset.

In an embodiment, after generating the bounding box surrounding the selected one of the suggested images, the method includes a step of receiving, via the user-input actuator, an input from the user confirming a placement and size of the bounding box. An embodiment of the method includes a step of modifying a boundary of the bounding box based on a user input.

In an embodiment, the step of segmenting the selected one of the suggested images within the bounding box includes a step of creating a plurality of prediction vectors within the selected one of the suggested images. The step of comparing the segmented selected one of the suggested images with the plurality of images from the trained data set may include comparing the plurality of prediction vectors to the plurality of images to determine the likelihood of the defect.

An embodiment of method includes a step of assigning, via the mixed reality headset, a prediction threshold to the captured one or more images including possible defects, wherein the prediction threshold determines a boundary of the bounding box. The prediction threshold can be altered. For example, a higher prediction threshold alters the boundary of the bounding box to reduce an area of the bounding box. Similarly, a lower prediction threshold alters the boundary of the bounding box to increase an area of the bounding box.

In an embodiment, the method includes a step of using, via the mixed reality headset, projective geometry to project an object onto the bounding box surrounding the selected one of the suggested images, such that the projected object is transmitted to server. In such an embodiment, the step of calculating the likelihood of the defect within the segmented selected one of the suggested images may include a step of comparing the projected object to the plurality of images from the trained data set.

An object of the invention is the provide a collaborative human and AI platform using mixed reality to improve the efficiencies related to infrastructure analysis, particularly by utilizing a generalized deep learning methodology.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

Contactless Structure Inspection:

Typical convolutional neural network (CNN) models are mostly composed of convolutional and pooling layers. In the convolutional layers, the input images are multiplied by small distinct feature matrices that are attained from the input images (corners, edges, etc.) and their summations are normalized by matrix size (i.e. kernel size). By convolving images, similarity scores between every region of the image and the distinct features are assigned. After convolution, the negative values of similarity in the image matrix are removed in the activation layer by using the rectified linear unit (ReLU) transformation operation. After the activation layer, the resultant image matrix is reduced to a very small size and added together to form a single vector in the pooling layer. This vector is then inserted in fully connected neural network where actual classification happens. The image vectors of the trained images are compared with the input image and a correspondence score is calculated for each classification label. The highest number indicates the classified label.

Figure 1:
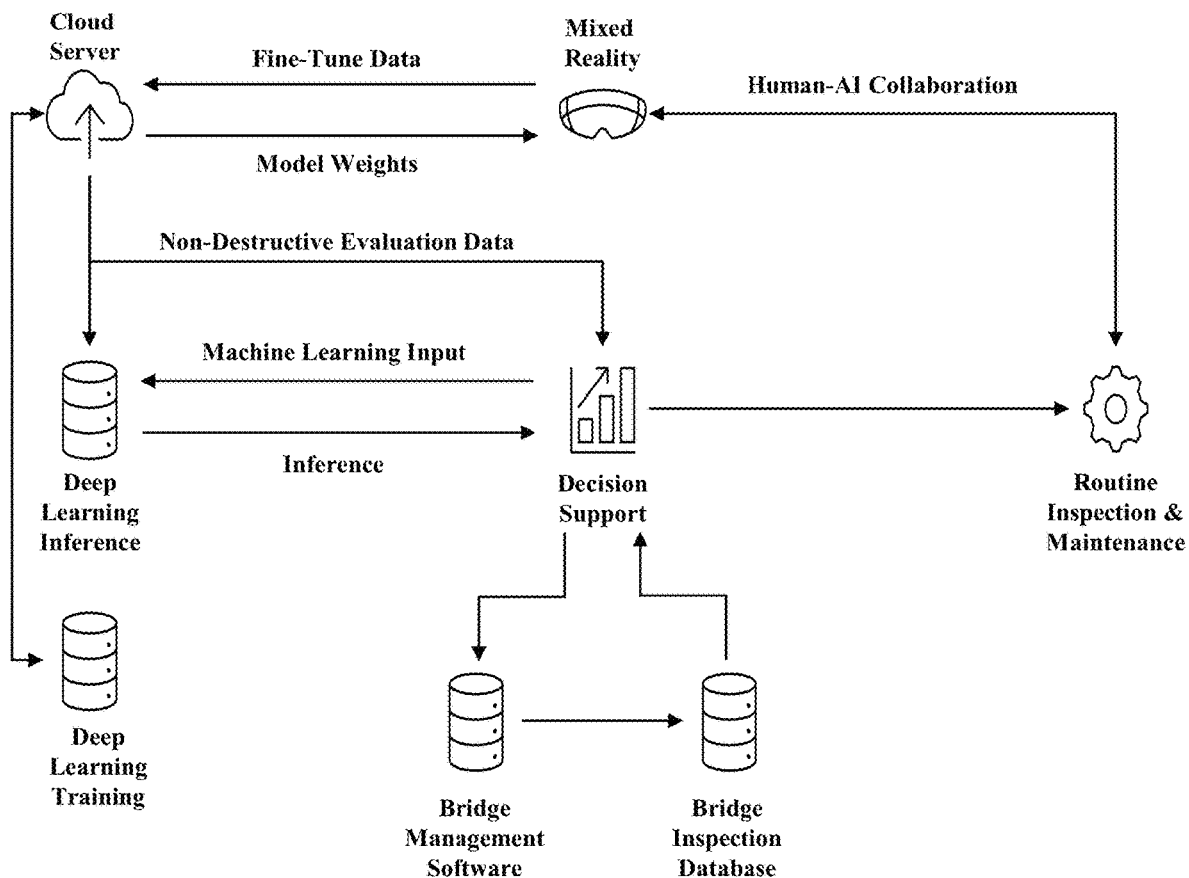
FIG. 1 is a system diagram of infrastructure assessment using an AI-powered mixed reality system.

With the above discussion in mind, the present invention includes AI-assisted infrastructure assessments using MR technology by employing state-of-the-art methods and algorithms from interdisciplinary practices, an overview of which is depicted in FIG. 1. Machine learning is vastly used for robust detection of cracks and spalls on infrastructures, whereas human-computer interaction concepts are employed for improving the assessment performance by including the professional judgement of the human inspector. As such, the present invention includes a hybrid system that employs a human-artificial intelligence collaboration via a headset to perform analyses of physical structures. The hybrid system performs automatic detection and segmentation of the defect regions using real-time deep learning operations instead of manually marking the defect regions in the MR platform. In this way, the hybrid system improves the efficiencies related to defect assessment, reducing or eliminating the need to mark defects, which is the current state of the art of MR technologies.

Accordingly, as shown in FIG. 1, the hybrid system includes a mixed reality component in communication with a deep learning module residing on a cloud server. The deep learning components of the hybrid system will be discussed in greater detail in the sections below; however, in use, the hybrid system leverages real-time decision making by a human operator with back-end AI-based recommendations resulting from a trained deep learning data set. Such a hybrid system is particularly useful in a construction-based implementation, in which routine analyses and inspections must take place to ensure the integrity of a given structure, such as a bridge. In particular, portions of the structure, such as a bridge, tend to be difficult to reach and analyze in a meaningful way without requiring heavy machinery to transport an inspector to the location to be inspected. Moreover, the analysis typically takes place via an optical inspection by the inspector, including manual measurements and calculations, and thereby rely on the attentiveness of a particular inspector to maintain accuracy. While such analyses can be further performed at a remote location via a reconstruction of the structure, including via VR, AR, or MR, the initial analysis and selection of anomalies for further analysis is strictly manual. However, the hybrid system leverages a real-time MR system that allows for collaboration between a human inspector and an AI platform at the structure itself, without relying on manual measurements or reconstruction at a remote location.

Figure 2:
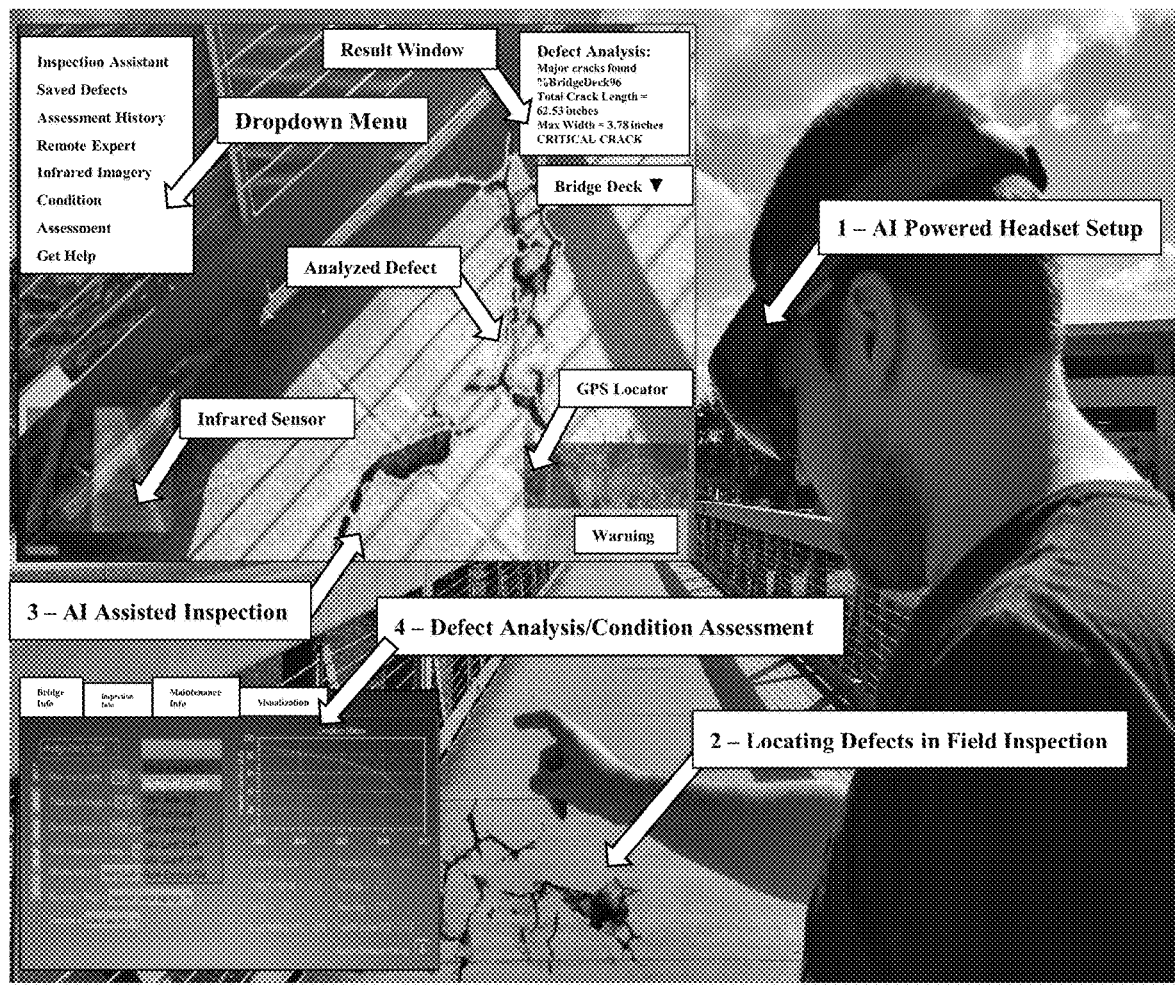
FIG. 2 is a visual representation of an AI-powered mixed reality system, with a headset user interface and analysis environment depicted for illustration purposes.

For example, in an embodiment, the hybrid system includes a MR headset configured to be utilized by a bridge inspector during routine inspection of infrastructure. While the inspector performs routine inspection tasks, the AI system integrated into the headset continuously guides the inspector and shows possible defect locations. If a defect location is confirmed by the human inspector, the AI system starts analyzing the defect by first executing defect segmentation, followed by defect characterization, to determine the specific type of the defect. If the defect boundaries require any correction or segmentation needs to be fine-tuned, the human inspector can intervene and calibrate the analysis. The alterations made by the human inspector (e.g. change of defect boundary, minimum predicted defect probability etc.) are used later for retraining of the AI model by following a semi-supervised learning approach. Accordingly, the accuracy of the AI and subsequent defect recognition and categorization improves over time as the inspector corrects the system. FIG. 2 shows an example of the proposed methodology in use.

TABLE 1 below shows comparison of the method described herein with that of prior art publications. As shown in TABLE 1, the instant method performs automated detection and segmentation of the defect regions using real-time deep learning operations, as opposed to the manual marking of the defect regions techniques taught in the prior art. In this way, the instant method provides efficiency advantages by saving significant amounts of time in defect assessment, rather than requiring the marking of each individual defect as is typical within the art.

Figure 6:
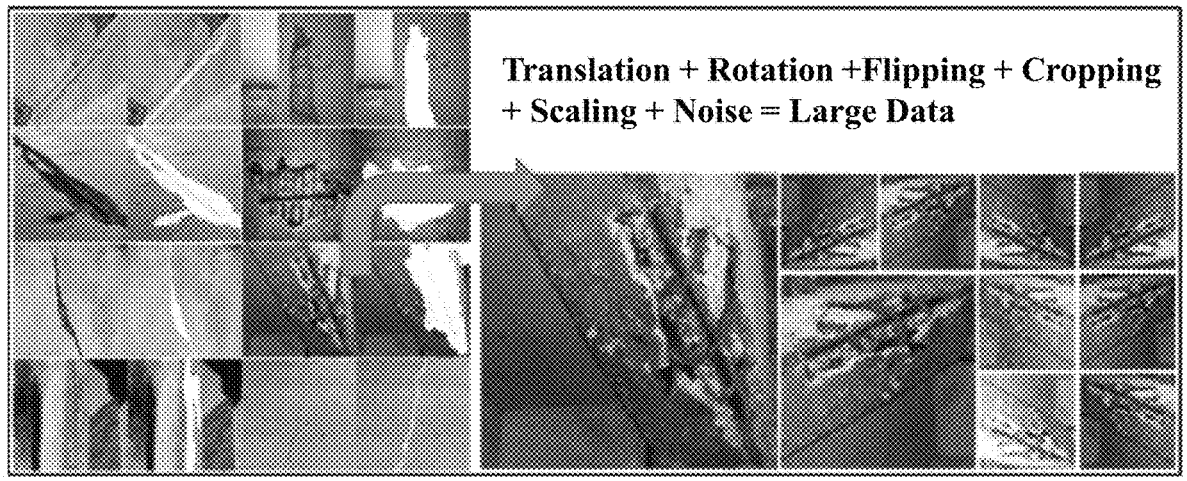
FIG. 6 depicts image annotation and data augmentation with translation, scaling, rotation and noise.

The instant method focuses on cracks and spalls; however, it is appreciated that other defect types can be analyzed through the method. The available defect images are gathered from various sources, including private industrial sources, transportation agencies, and academic institutions. While some of the data was only categorized but not annotated, a considerable portion of the data was annotated with bounding box pixel coordinates, and a relatively small dataset was annotated for segmentation. An extensive data augmentation was applied to the datasets to further increase AI prediction accuracy. The data augmentation included rotation, scaling, translation, and Gaussian noise. The annotation styles of all of the training datasets were unified and converted to Pascal VOC 2012 annotation format. The data annotation and augmentation steps are depicted in FIG. 6. The summary information of the training datasets is shown in TABLE 2.

TABLE 1

| Ionnis (2017) | Moreu et al. (2017) | Bae et al. (2013) | Xie et al. (2017) | Instant Method |
|---|---|---|---|---|
| Remote bridge inspections with HoloLens | Structural inspection and measurement using HoloLens | MR for 3D scene reconstruction of structure | CNN-based crack detection | MR-assisted bridge condition assessment |
| Data collections monitored from remote location | On-site measurement of defects | Image data is reconstructed after data collection | Post-processing of images to identify defects | On-site system to augment bridge inspector's performance |
| Focused on visualization and post-processing of data | Relies on human while obtaining measurements | No defect detection; 3D model used for inspection | Detection performance relies on AI system only | Creates collective intelligence via user-AI collaboration |
| Uses high-resolution defect images on real-size bridge models | Used 3D projective geometry for measurement estimations | Uses 3D projective geometry to register images | Uses basic data augmentation techniques to increase training dataset | Uses extensive data augmentation that generates many variations of defect images |

Figure 3:
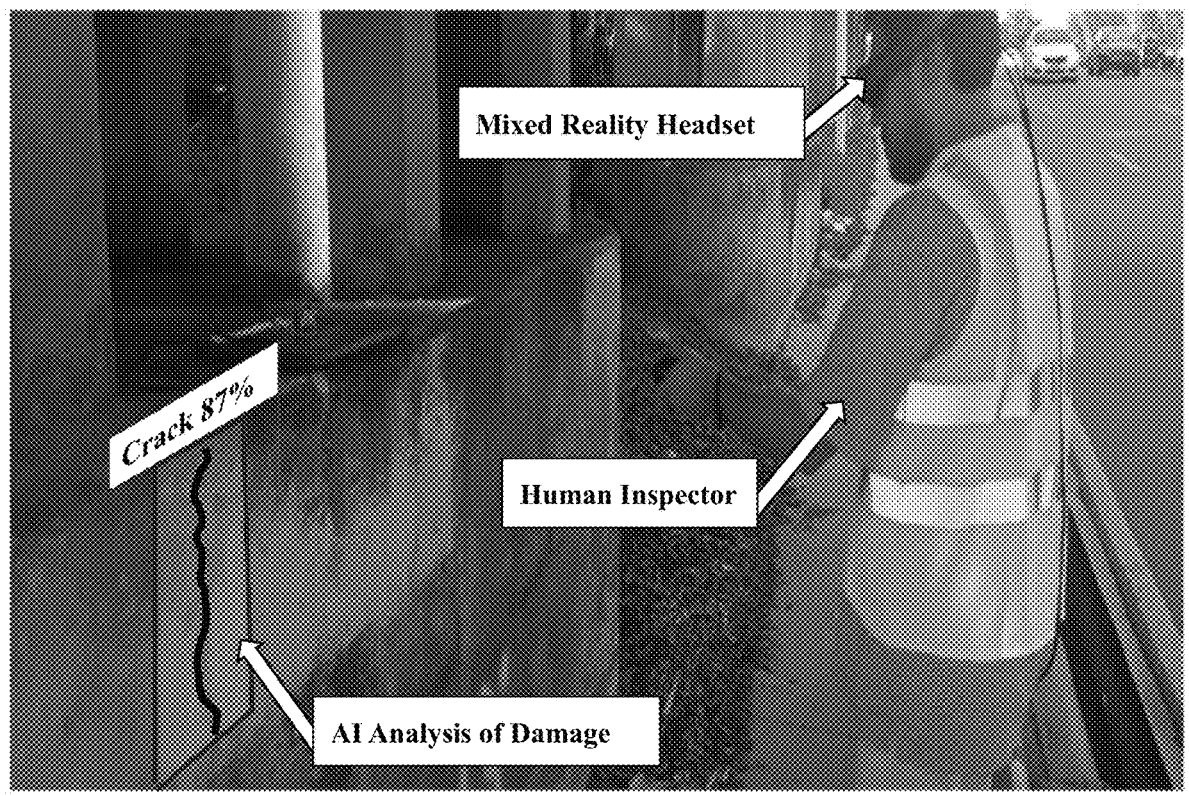
FIG. 3 depicts a bridge inspection using an AI-powered mixed reality system.
Figure 4:
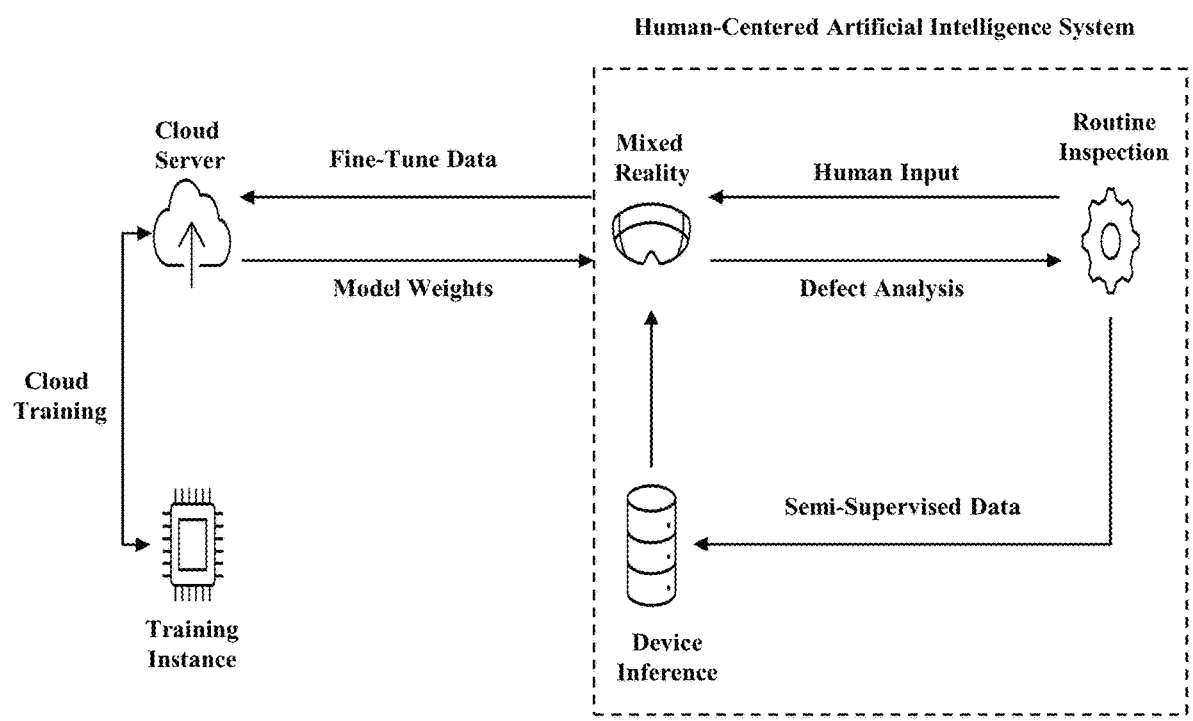
FIG. 4 is a system diagram of AI-powered mixed reality inspection.

Another advantage of the system is that the inspector can analyze defects in a remote location while reducing need for access equipment. Even though in some cases, hands-on access is inevitable (i.e. determining sub-concrete defects); the system can be still effective for quick assessments in the remote location. If the defect location is far or in a hard to reach location, the headset can zoom in and still perform assessment without needing any access equipment such as snooper truck or ladder. The proposed framework is illustrated in FIGS. 3-4, showing both real-life and process flow diagrams of the instant mixed reality methodologies.

Figure 5:
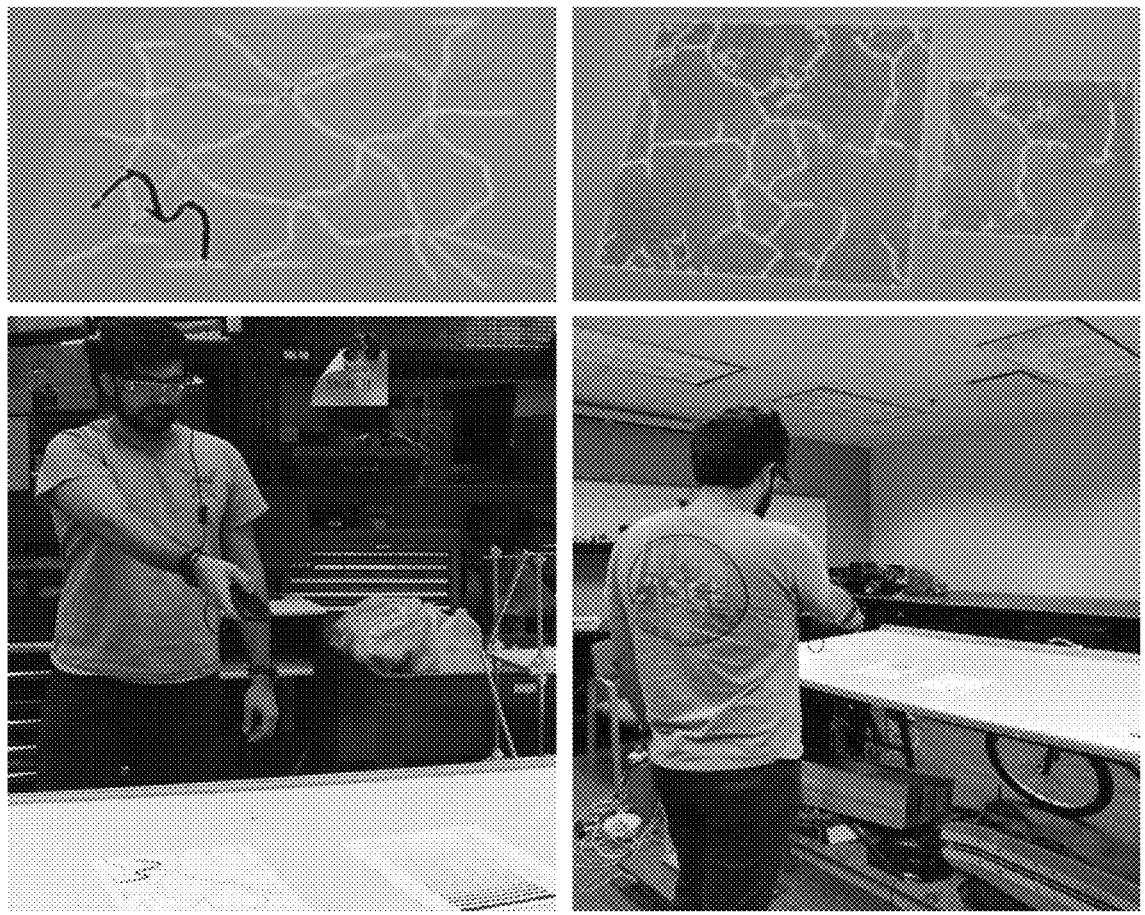
FIG. 5 depicts an experimental setup using the instant methodologies.

Data collection is an important step of developing an AI system. The significant challenges of potential real-life applications must be carefully evaluated to collect suitable data for AI training. A preliminary work has been conducted in CITRS Lab (Civil Infrastructure Technologies for Resilience & Safety) at the University of Central Florida (UCF) in order to determine the important aspects of field data collection procedure. The effects of illumination, maximum crack width, target distance, and camera resolution have been investigated in a laboratory environment. A set of synthetically generated crack images with different thicknesses, brightness and pattern are printed on letter size papers and placed on white platform. The experiment setup is demonstrated in FIG. 5.

TABLE 2

| Dataset Annotation | Class Types | Dataset Size | Source |
|---|---|---|---|
| Sub-cropped, labeled by not annotated | Cracking and intact concrete | 40,000 images (large data augmentation) | Concrete crack dataset [17] |
| Labeled and annotated for boundary boxes | Line crack, alligator crack, joint failure, spalling | 9,000 images, 15,500 labels (no data augmentation) | Road damage dataset [18] |
| Labeled and annotated for segmentation | Cracking and spalling | 2,000 images (little data augmentation) | Bridge inspection dataset [19] |
| Labeled and annotated for segmentation | Cracking and spalling | 300 images (no data augmentation) | Image scrapping and field data |

The trainings of the AI models were performed in the Newton Visualization Cluster operated by UCF Advanced Research Computing Center (2014). The Newton Visualization Cluster includes 10 compute nodes with 32 cores and 192 GB memory in each node; two Nvidia® V100 GPUs are available in each compute node totaling 320 cores and 20 GPUs. The model trainings were performed on two clusters with total of 4 GPUs. A single training was executed for 1 million steps, which takes approximately 75 hours to perform. The training was repeated for multiple times in order to find optimal hyperparameters.

Figure 7:
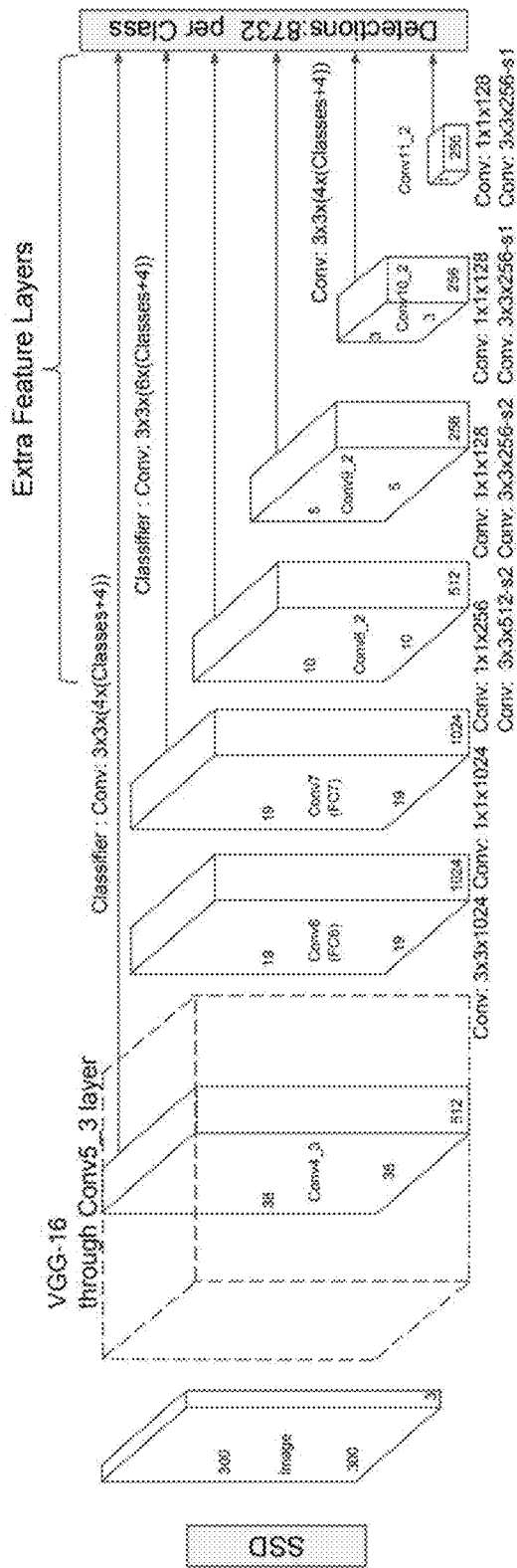
FIG. 7 is a graphical depiction of an original Single Shot MultiBox Detector (SSD) architecture.
Figure 8:
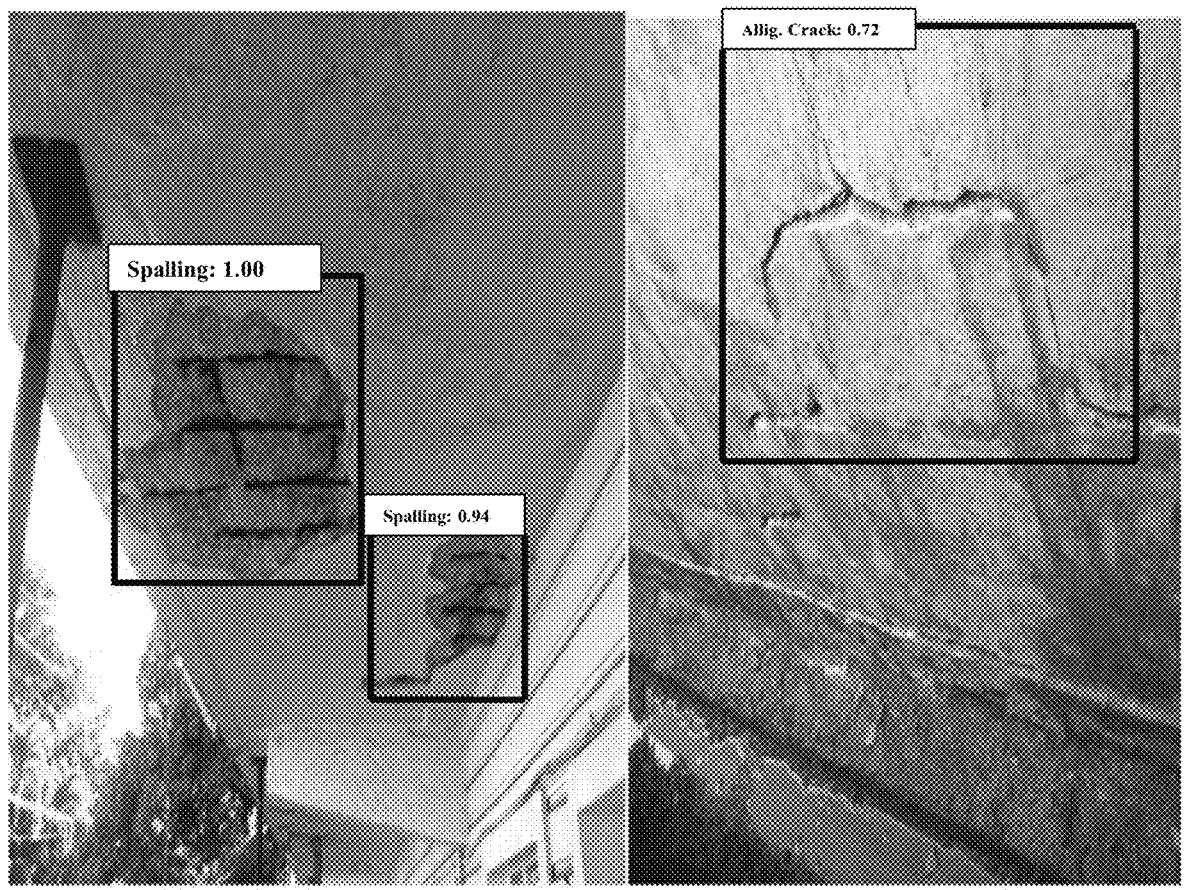
FIG. 8 is an example of damage detections on real-world structures.

For real-time detection of damages, a light weight architecture that can run on mobile CPUs was selected. Single Shot MultiBox Detector (SSD) is a relatively new, fast pipeline developed by Liu et al. (2016). SSD uses multi boxes in multiple layers of convolutional network, and therefore has an accurate region proposal without requiring many extra feature layers. SSD predicts very quickly while sacrificing very little accuracy, as opposed to other models in which significantly increased speed comes at the cost of significantly decreased detection accuracy. [20]. The network architecture of the original SSD model is shown in FIG. 7. Moreover, the original SSD disclosure utilized VGG-16 as a base architecture; due to the extensive hardware and memory requirements of new classifiers (such as MobileNetV2, which offers faster prediction speeds at similar accuracy levels in a much small network [20]), VGG was chosen as the base architecture for the instant method to benefit transfer learning. Accordingly, the weights of already trained networks could be implemented in the instant method by fine-tuning only the certain classifier layers based on the size of the available dataset. FIG. 8 shows an example of the use of the instant to classify challenging structural damages, including spalling in multiple locations and different depths (in the image on the left) and an angled alligator crack in a concrete surface (in the image on the right).

Figure 9:
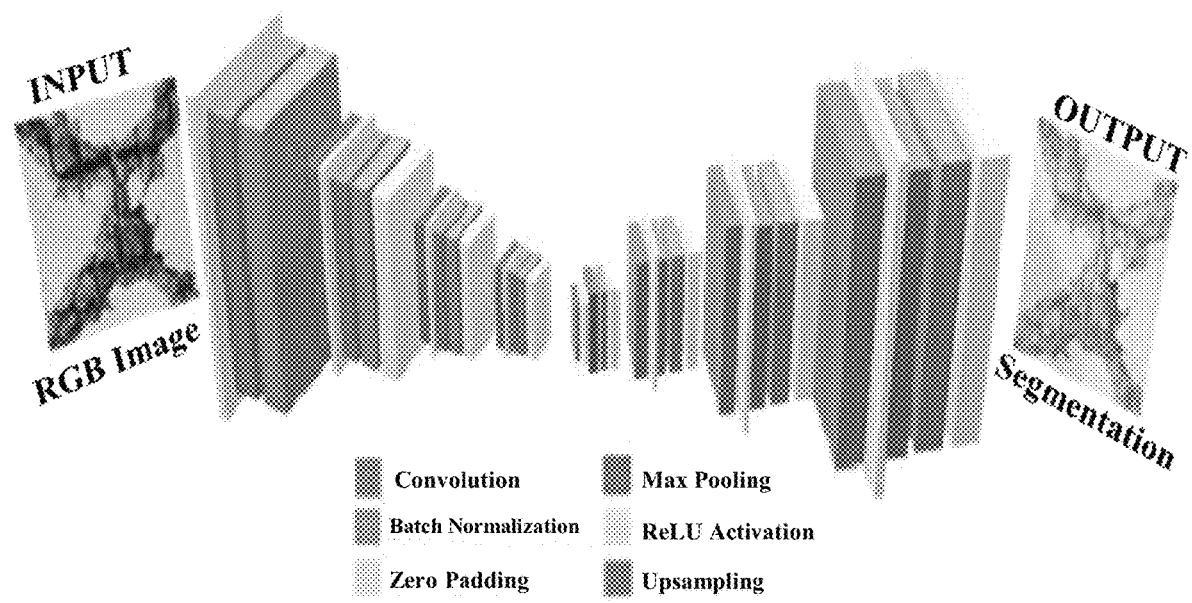
FIG. 9 is a graphical illustration of a segmentation architecture.

For concrete defect assessment, it is not enough to detect the damage in a bounding box. The damage also needs to be segmented from intact regions in order to perform defect measurement. Therefore, another AI model is implemented in parallel to the SSD to perform segmentation of the damage regions. Popular segmentation models such as FCN, UNet, SegNet and SegCaps [21] were investigated; however, their architectures were found to be too large for the small annotated dataset used in the instant method. To overcome this problem, the VGG weights that were retrained in SSD architecture were used in a relatively small, customized segmentation architecture that is inspired by SegNet model, which is depicted in FIG. 9. [22].

Deep learning approaches have been shown robust in identifying damages; yet these methods require precisely labeled, large amount of training data for high accuracy complementary to visual assessment of inspectors. Especially in image segmentation operations, in which damages are subtracted from the image background for further analysis, there is a strong need to localize the damaged region prior to segmentation operation. However, available segmentation methods mostly focus on the latter step (i.e., delineation), and mislocalization of damaged regions causes accuracy drops. Inspired by the superiority of human cognitive system, where recognizing objects is simpler and more efficient than machine learning algorithms, which are superior to human in local tasks, the hybrid system dramatically improves the accuracy of the damage quantification (detection+segmentation) using an attention-guided technique.

Figure 10:
FIG. 10 is an example of attention guided segmentation used to quantify real-world defects.
Figure 11:
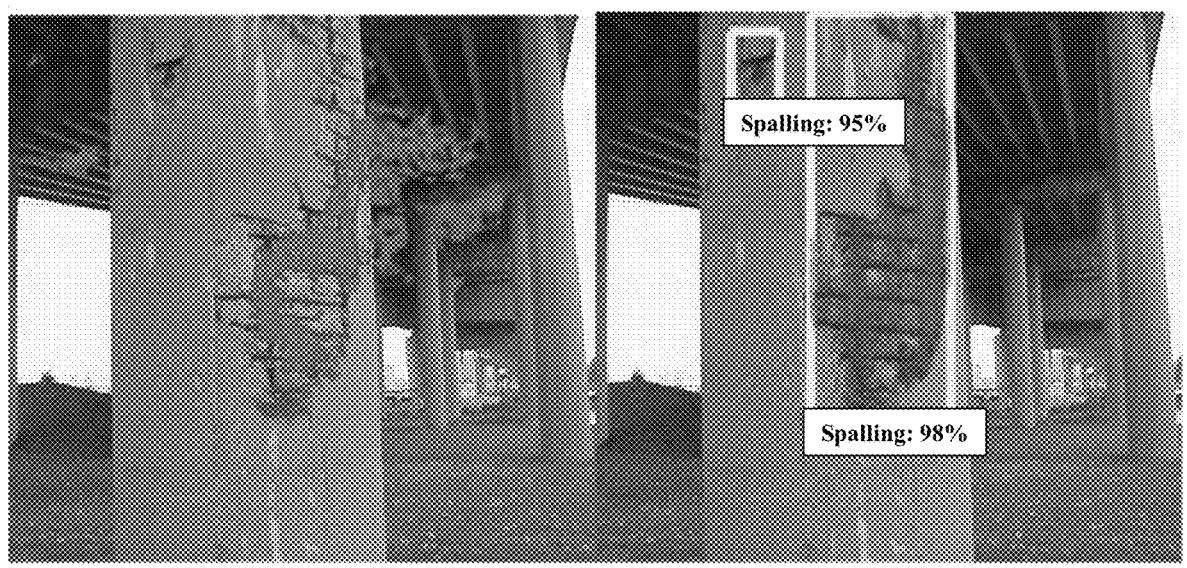
FIG. 11 depicts the increased performance of defect segmentation in the attention guided approach.

As such, as a unique approach for damage segmentation, the instant method employs an attention-guided technique, in which a sequential connection is created between detection and segmentation models. First, images are first fed into a damage detection pipeline and, when the bounding box is verified by the user, damage segmentation is executed only for the region inside the detected bounding box. This approach significantly improves the accuracy of segmentation and successfully prevents outliers. FIGS. 10-11 show the performance improvement provided by attention-guided segmentation as compared to the segmentation without attention guidance. As shown in FIGS. 10-11, the segmentation model is first executed for the entire image, which yielded inaccurately segmented regions (images on the left). In the image on the right of the FIGS. 10-11, only the bounding box region is fed into the segmentation pipeline, resulting in much higher accuracy.

Figure 12:
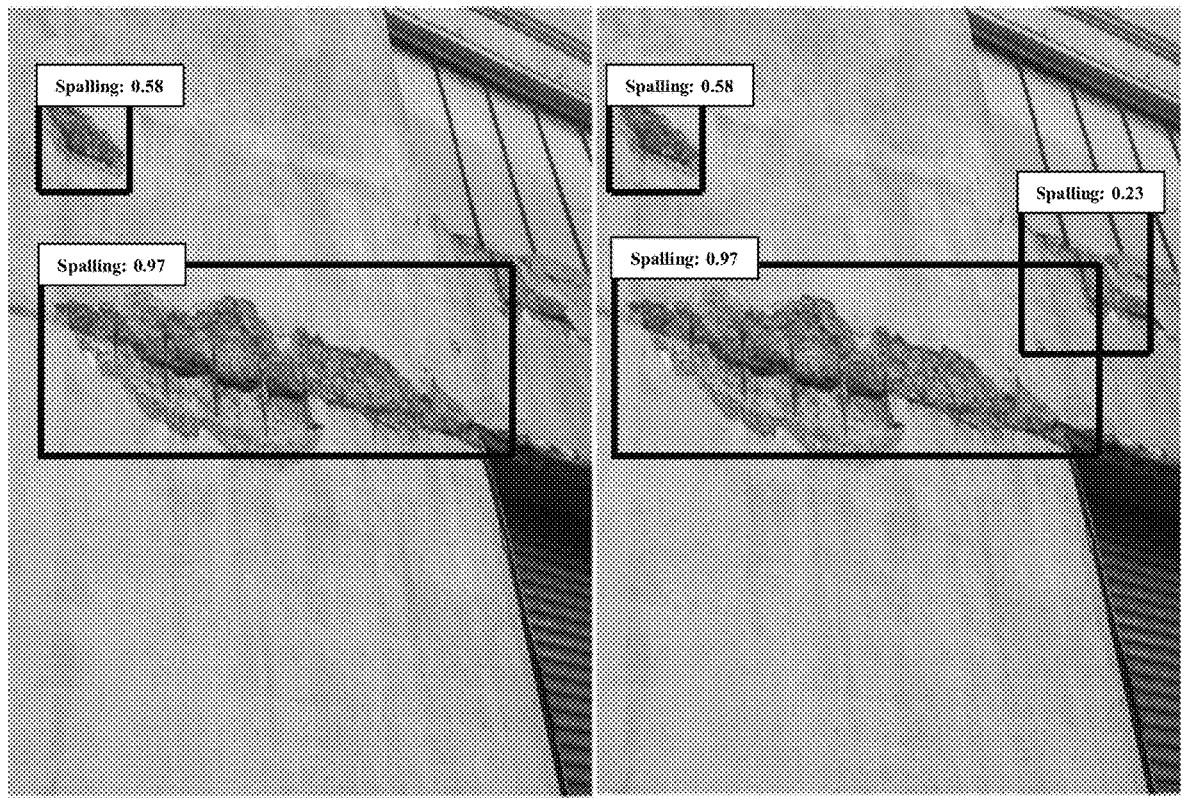
FIG. 12 depicts the use of different tolerance thresholds used to classify real-world defects.
Figure 13:
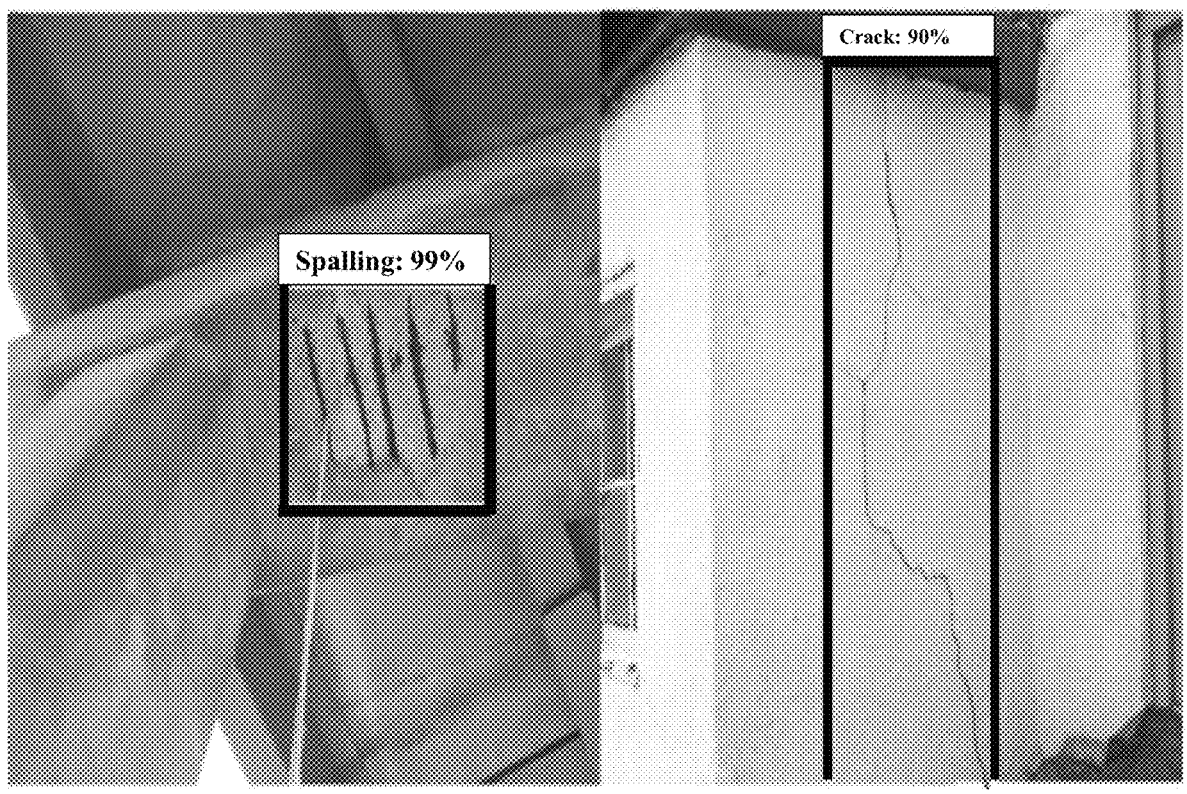
FIG. 13 depicts the defect localization performance in challenging real-world scenarios.
Figure 14:
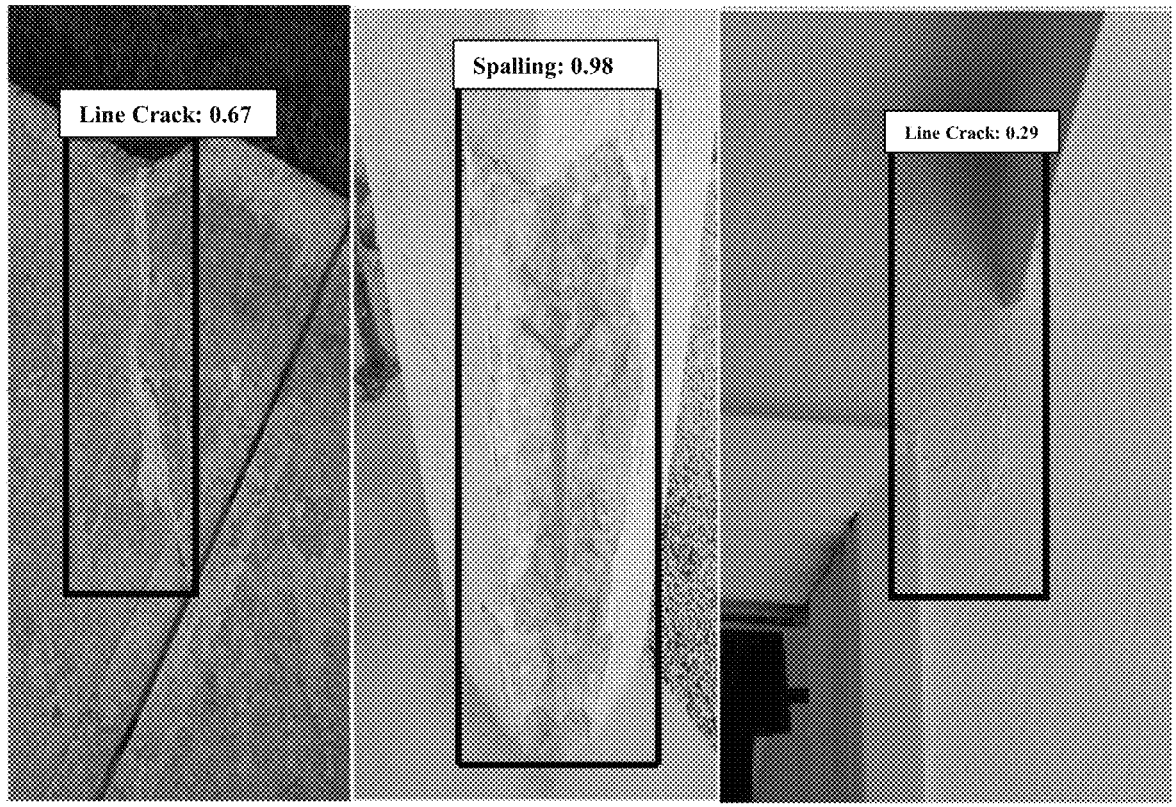
FIG. 14 depicts examples of sequential detection and segmentation used to quantify real-world defects.
Figure 15:
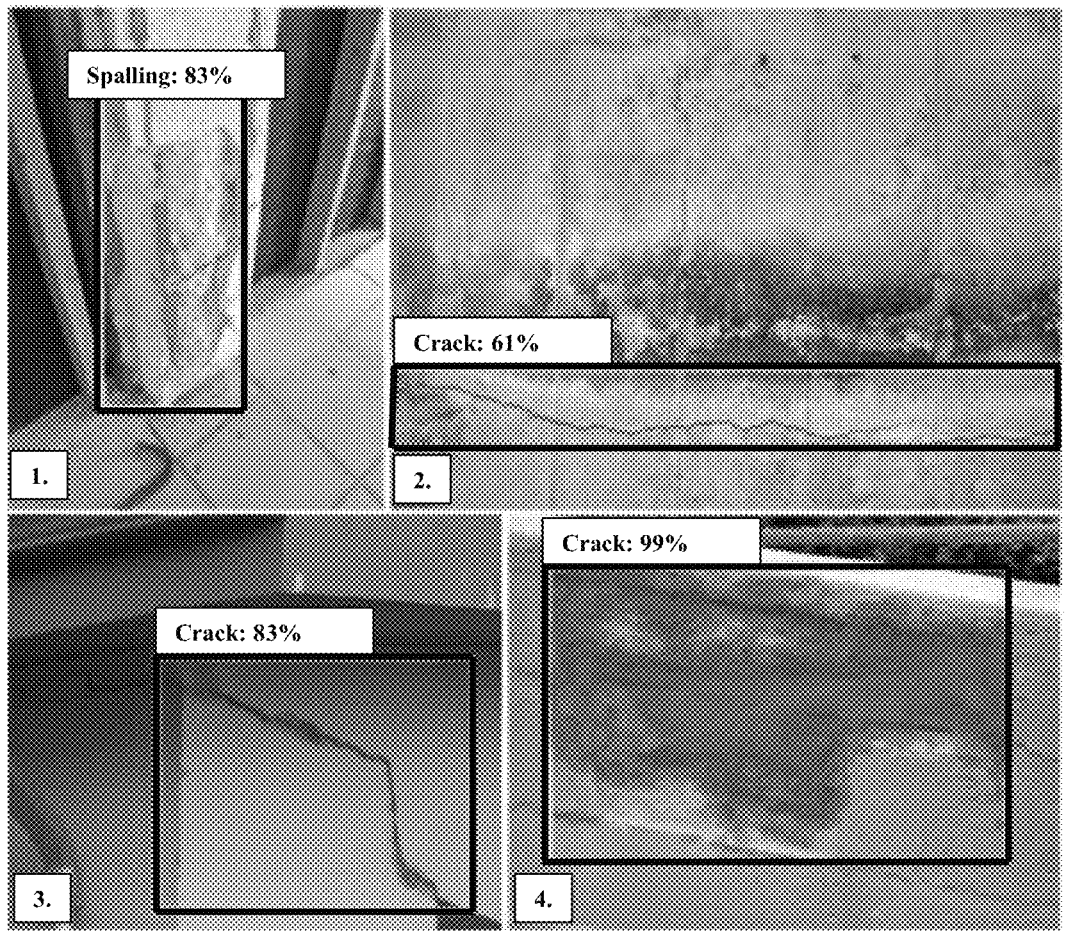
FIG. 15 is an example of sequential detection and segmentation used to quantify real-world defects.

By mixing AI with user interaction, the resulting human-computer collaboration provides for collective intelligence, improving over the prior art. As such, the prediction threshold values in the inference mode can be adjusted either by the user or the AI thorough the MR system. This type of hybrid AI outperforms a traditional AI standalone implementation, and is more efficient than a traditional human user standalone implementation. [23]. For example, during a bridge inspection, the user can modify the prediction threshold to improve the accuracy of the detection and determine the boundary region of the segmentation. As shown in FIG. 12, real-time damage detection does not show one of the spall regions to the inspector when the prediction threshold is set to 0.5 (in the image on the left). However, when the prediction threshold is adjusted to 0.2, the missing spall region is also detected (in the image on the right). The values shown in FIG. 13 represent the probability of accurate predictions for each identified concrete defect. Similarly, the segmentation boundary can be fine-tuned by the user or the AI by adjusting the prediction threshold. Thus, the damage area can be calculated at higher accuracy. The fine-tuned segmentations, along with the corresponding bounding box coordinates, are recorded for future re-training while benefitting from semi-supervised learning. Some examples of results of human-AI collaborative damage detection and segmentation are shown in FIG. 14 and FIG. 15.

The condition assessment methodology based on the AI system's damage analysis requires answers to questions directed to the width of a crack, the proximity of objects in a view, camera metrics (such as height, rotation, and focal length), and other similar inquiries. Such information is required for identifying actual measures of defects for accurate assessment of infrastructures, as well as for augmenting a certain object onto a 3D view or highlighting defects in an MR headset. Using projective geometry and camera calibration models, accurate projections of objects onto 3D can be accomplished, achieving accurate scene reconstruction, and ultimately achieving accurately-predicted dimension of the objects. However, performing transformations in 3D spaces requires the use of 4D projective geometry, rather than conventional 3D Euclidian geometry. [24]. The projection matrix allowing camera rotation is defined as in Equation 1:

$$x = K[Rt]X \qquad (1)$$

where x represents the image coordinates; K represents the intrinsic matrix; R represents the rotation matrix; t represents the translation; and X represents the world coordinates. The projected coordinate vector x is calculated by multiplying the world coordinates by the rotation and the translation free projection matrix. The coordinate parameters are then put into a system of equations as in Equation 2:

$$w \begin{bmatrix} u \\ v \\ 1 \end{bmatrix} = K \begin{bmatrix} a & s & u_0 \\ 0 & \beta & v_0 \\ 0 & 0 & 1 \end{bmatrix} \begin{bmatrix} r_{11} & r_{12} & r_{13} & t_x \\ r_{21} & r_{22} & r_{23} & t_y \\ r_{31} & r_{32} & r_{33} & t_z \end{bmatrix} \begin{bmatrix} x \\ y \\ z \\ 1 \end{bmatrix} \qquad (2)$$

Figure 16:
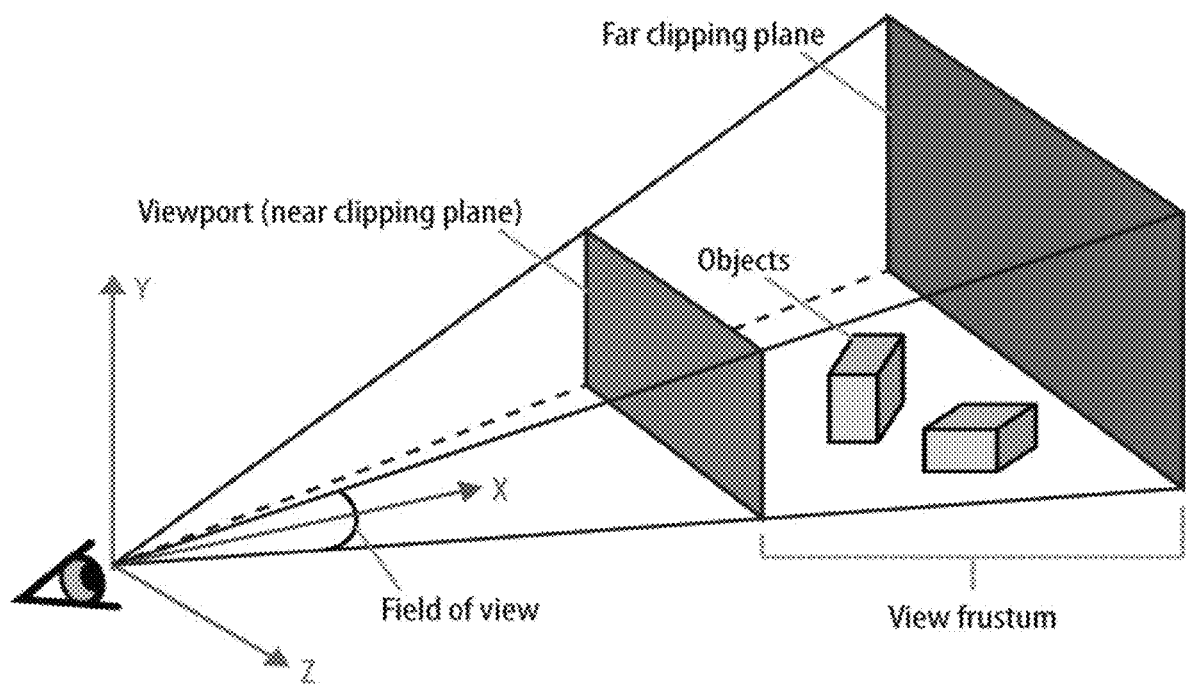
FIG. 16 is a graphical depiction of a camera, a viewport, and a projection of real-world objects onto 2D image plane.

The local coordinates on the image plane are represented by u and v; w defines the scale of the projected object; α and β represent rotation angles with respect to coordinate axes; and s represents the sinus function. Unity allows for camera control that helps developers perform correct projections onto the image plane from a 3D view, as shown as an example in FIG. 16.

Figure 17:
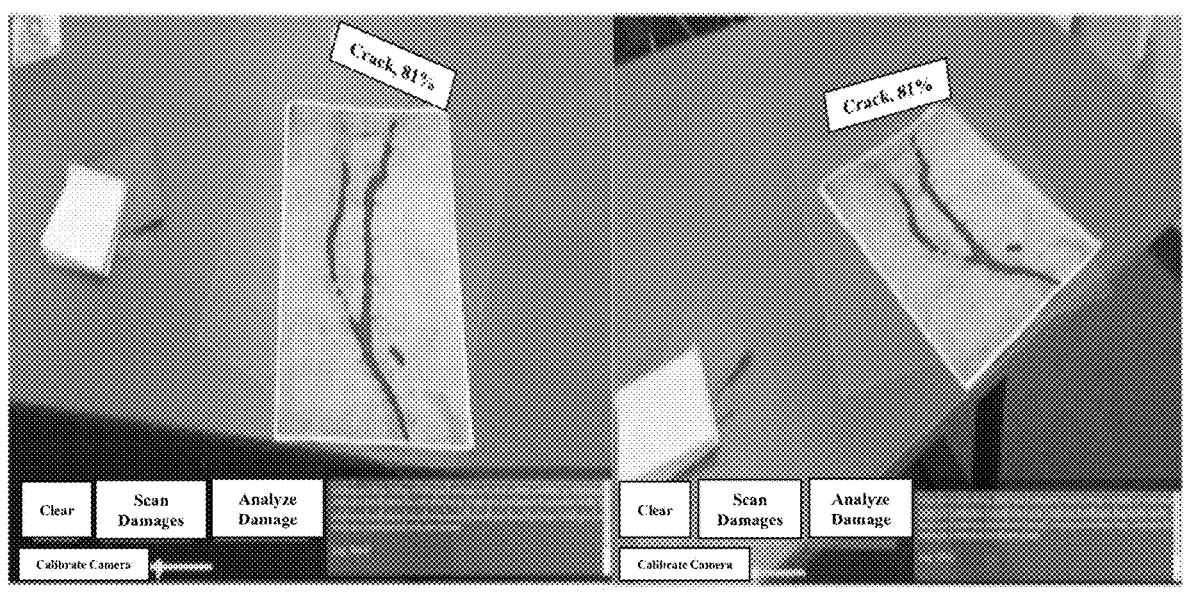
FIG. 17 depicts markerless tracking of on-the-fly image targets created from the AI analysis.

The projection calculations are held automatically in AR platforms. After a crack or spall region is detected and accurately segmented from the scene, an image target is automatically created in the platform environment. The image targets work with feature-based 3D pose estimations using the calculated projection matrix. [42]. The projection matrix can be calculated by following the stereo camera calibration procedure provided by individual headset manufacturers. In the calibration, intrinsic and extrinsic camera parameters, such as camera focal length, location, and orientation of the camera, are estimated using the headset sensors, specifically the gyroscope and head-position-tracker. After a successful calibration, the simple proportioning of the image pixel size to a known real-world dimension (assuming that the camera offset from eye focus is known) is used to calculate the area of a spall or length of a crack. After successful calibration, camera intrinsic and extrinsic parameters such as camera focal length, location and orientation of the camera are retrieved in Unity using the headset sensors gyroscope and head-position-tracker. The system is capable of creating on-the-fly image targets from the damage-detection output and perform fast, robust markerless tracking using Visual SLAM (simultaneous location and mapping). 3D pose is estimated accurately at different angles and distances; the inspector still sees the overlay information on correct location as shown in FIG. 17.

Figure 18:
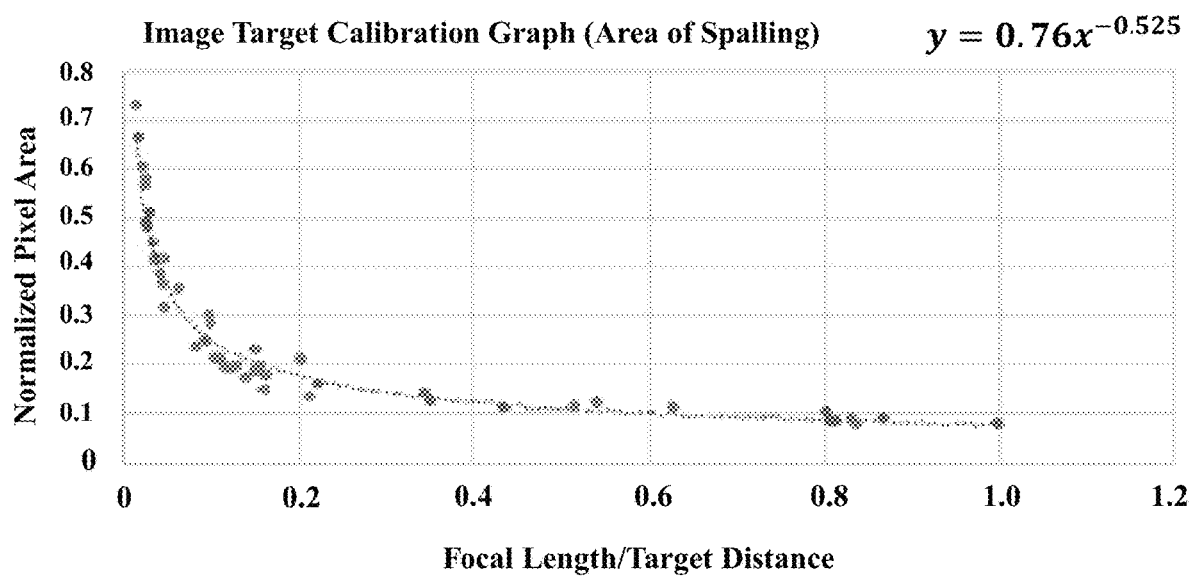
FIG. 18 is an example of the calibration of image targets for more accurate predictions of geometrical properties.

In order to improve the estimation accuracy of the geometric properties, the AR target object projected onto the defect surface is continuously calibrated using non-linear least square fitting. The necessary data points were obtained in real-time from the headset's different camera positions as the inspector gets closer to the object or looks at the defect from different angles. FIG. 18 shows the details of the non-linear least square fit calculation of an example calibration of image target to estimated area of spalling. In the horizontal axis of the calibration, the estimated target distance normalized by the focal length, and in the vertical axis, the pixel area of the target normalized by the camera resolution were used. The fit equation corrects the known distance parameter in the dimension proportion to predict the area at higher accuracy.

Figure 19:
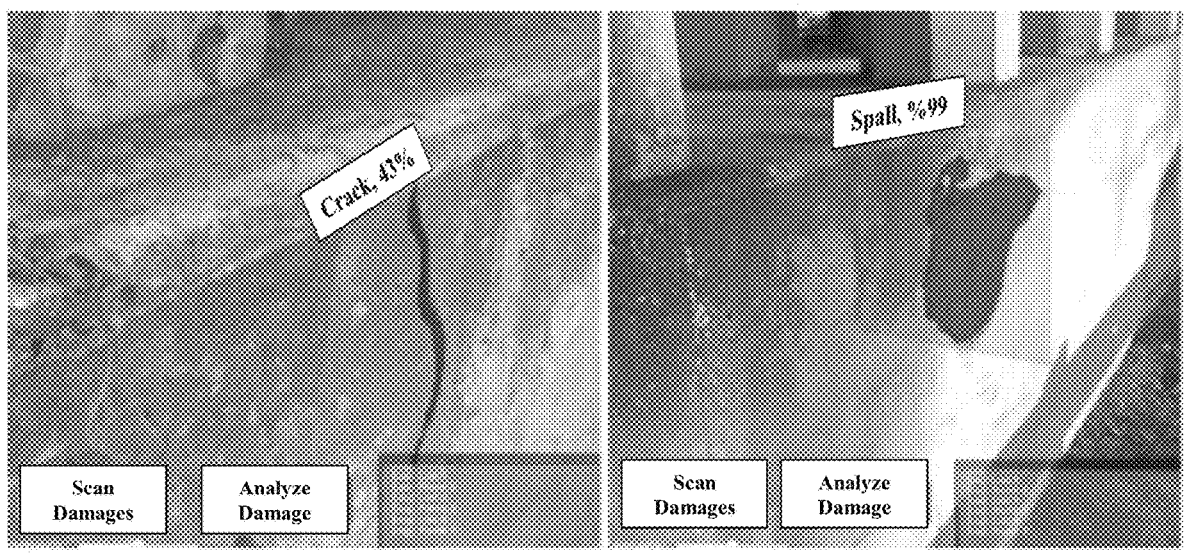
FIG. 19 shows real-world examples from the headset showing AI analysis results projected on concrete defects.
Figure 20:
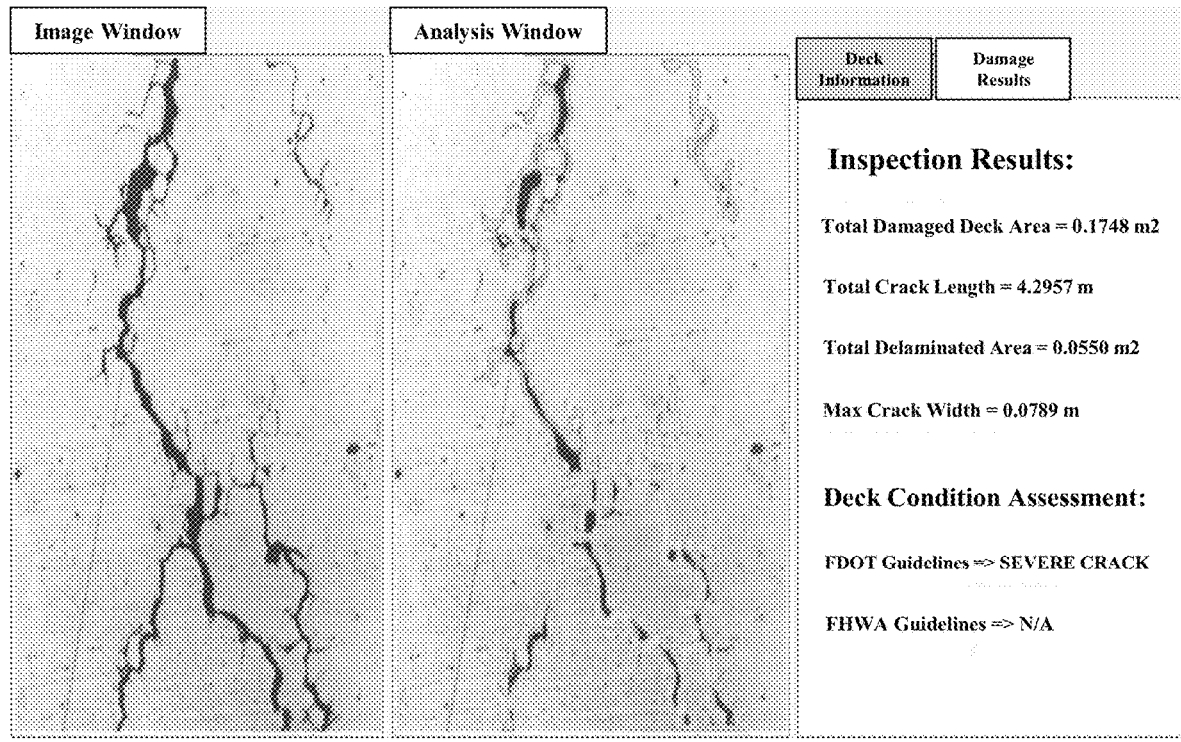
FIG. 20 depicts software-based implementations of defect conditions that are estimated based on the AI analysis results.

An advantage of the system is that the user has the opportunity to investigate a certain defect in more detail if the condition information of the defect is shown to the user in real-time. For example, when a crack condition is shown in the headset interface as a "Severe Crack" (according to American Association of State Highway and Transportation Officials (AASHTO) guidelines), the user may wish to perform a comprehensive crack assessment. As such, by using the systems described herein, the user would receive assistance from the systems, leading to more objective and accurate inspection practices. The condition assessment methodologies described herein aim to implement a quantified assessment procedure in which the limit values are interpreted from major inspection guidelines, such as by assigning values representing a positive assessment (a value of 1, representing a recommendation to take no action or to take simple protective action); a fair assessment (a value of 2, representing a recommendation to take protective action or repair action); a poor assessment (a value of 3, representing a recommendation to take repair action or rehabilitation action); or a severe assessment (a value of 4, representing a recommendation to take rehabilitation action or replacement action). FIG. 19 depicts an example from the headset showing AI analysis results projected on concrete defects using the instant methodologies, and FIG. 20 depicts a software-based implementation example of the condition assessment methodologies described herein.

CONCLUSION

The instant methodologies aimed to integrate and demonstrate novel AI detection and segmentation algorithms into a MR framework by which a bridge inspector, for example, can benefit from this system during his/her routine inspection/assessment tasks. The inspector can analyze a damage in-real time and calculate its condition state without needing to perform any manual measurement. The methods described herein explain how a framework for collective human-AI intelligence can be created and how it can outperform the conventional or fully automated concrete inspections. The human-centered AI requires only minimal input from the human inspector and verifies its predictions before finalizing a damage assessment task. Such a collaboration layer between human expert and AI is unique approach of the present methodologies. Furthermore, the AI system follows a semi-supervised learning approach and consistently improves itself with use of verified detection and segmentation data in re-training. The use of semi-supervised learning addresses successfully the problems of small data in AI training particularly encountered in damage detection applications where a comprehensive, publicly available image dataset is unavailable.

The methodologies described herein aimed to improve the real-life implementations of structural analyses by merging the engineer/inspector's expertise with AI assistance using a human-centered computing approach, thus yielding more reliable civil infrastructure visual assessment practice. In machine learning based approaches, the availability of training data is the most critical aspect of developing a reliable system with good accuracy in recognition. Yet, in infrastructure assessment, creating a large image dataset is particularly a challenging task. The proposed method therefore used an advanced data augmentation technique to generate synthetically sufficient amount of crack and spall images from the available image data. Utilizing Non-destructive Evaluation (NDE) methods effectively in bridge decision making has recently gained importance in the bridge management research with the growing number of vision-based technologies for infrastructure inspections (i.e. camera-based systems, unmanned aerial systems, infrared thermography, and ground penetrating radar). The instant method collects more objective data for infrastructure management while also benefitting from inspectors' professional judgement. In the short-term, the proposed method can serve as an effective data collection method and in the long term, as the AI systems become more reliable approaches for infrastructure inspections, the proposed system will be a more feasible approach. The AI assisted MR inspection framework presented will be expanded in many ways in a future study. First, a multichannel analysis method will be investigated in order fuse multiple sources of data (i.e. imagery data and infrared thermography). This new method will bring more capabilities such as detecting and analyzing subconcrete delamination and steel corrosion.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

INCORPORATION BY REFERENCE

[1] Behzadan, A. H., S. Dong, and V. R. Kamat. Augmented Reality Visualization: A Review of Civil Infrastructure System Applications. Advanced Engineering Informatics, Vol. 29, No. 2, 2015, pp. 252-267. https://doi.org/10.1016/j.aei.2015.03.005.

[2] Mihelj, M., D. Novak, and S. Begug. Virtual Reality Technology and Applications. 2014.

[3] Azuma, R., R. Behringer, S. Feiner, S. Julier, and B. Macintyre. Recent Advances in Augmented Reality. IEEE Computer Graphics and Applications, Vol. 2011, No. December, 2001, pp. 1-27. https://doi.org/10.4061/2011/908468.

[4] Sutherland, I. E. The Ultimate Display. 1965.

[5] Coutrix, C., and L. Nigay. Mixed Reality: A Model of Mixed Interaction. Proceedings of the working conference on Advanced visual interfaces—AVI '06, 2006, pp. 43-50. https://doi.org/10.1145/1133265.1133274.

[6] Ioannis, B. Mixed Reality Constructs a New Frontier for Maintaining the Built Environment. Proceedings of the Institution of Civil Engineers—Civil Engineering, Vol. 170, No. 2, 2017, p. 53. https://doi.org/10.1680/jcien.2017.170.2.53.

[7] Moreu, F., B. Bleck, S. Vemuganti, D. Rogers, and D. Mascarenas. Augmented Reality Tools for Enhanced Structural Inspection. No. 2, 2017, pp. 3124-3130.

[8] Yokoyama, S., and T. Matsumoto. Development of an Automatic Detector of Cracks in Concrete Using Machine Learning. Procedia Engineering, Vol. 171, 2017, pp. 1250-1255. https://doi.org/10.1016/j.proeng.2017.01.418.

[9] Jahanshahi, M. R., and S. F. Masri. Adaptive Vision-Based Crack Detection Using 3D Scene Reconstruction for Condition Assessment of Structures. Automation in Construction, Vol. 22, 2012, pp. 567-576. https://doi.org/10.1016/j.autcon.2011.11.018.

[10] Adhikari, R. S., O. Moselhi, and A. Bagchi. Image-Based Retrieval of Concrete Crack Properties for Bridge Inspection. Automation in Construction, Vol. 39, 2014, pp. 180-194. https://doi.org/10.1016/j.autcon.2013.06.011.

[11] German, S., I. Brilakis, and R. Desroches. Rapid Entropy-Based Detection and Properties Measurement of Concrete Spalling with Machine Vision for Post-Earthquake Safety Assessments. Advanced Engineering Informatics, Vol. 26, No. 4, 2012, pp. 846-858. https://doi.org/10.1016/j.aei.2012.06.005.

[12] Zaurin, R., T. Khuc, F. N. Catbas, and F. Asce. Hybrid Sensor-Camera Monitoring for Damage Detection: Case Study of a Real Bridge. Journal of Bridge Engineering, Vol. 21, No. 6, 2015, pp. 1-27. https://doi.org/10.1061/(ASCE)BE.1943.

[13] Hiasa, S. Investigation of Infrared Thermography for Subsurface Damage Detection of Concrete Structures. Electronic Theses and Dissertations. Paper 5063. <http://stars.library.ucf.edu/etd/5063>, 2016.

[14] AASHTO. Guide Manual for Bridge Element Inspection. Bridge Element Inspection Manual, 2011, p. 172.

[15] FHWA. National Bridge Inspection Standards Regulations (NBIS). Federal Register, Vol. 69, No. 239, 2004, pp. 15-35.

[16] FDOT. Florida DOT Bridge Inspection Field Guide. 2016.

[17] Prasanna, P., K. J. Dana, N. Gucunski, B. B. Basily, H. M. La, R. S. Lim, and H. Parvardeh. Automated Crack Detection on Concrete Bridges. IEEE Transactions on Automation Science and Engineering, Vol. 13, No. 2, 2016, pp. 591-599. https://doi.org/10.1109/TASE.2014.2354314.

[18] Maeda, H., Y. Sekimoto, T. Seto, T. Kashiyama, and H. Omata. Road Damage Detection Using Deep Neural Networks with Images Captured Through a Smartphone. 2015, pp. 4-6.

[19] Yang, L., B. Li, W. Li, Z. Liu, G. Yang, and J. Xiao. A Robotic System towards Concrete Structure Spalling and Crack Database. 2017 IEEE International Conference on Robotics and Biomimetics (ROBIO), Robotics and Biomimetics (ROBIO), 2017 IEEE International Conference on. 1276. https://login.ezproxy.net.ucf.edu/login?auth=shibb&url=http://search.ebscohost.com/login.aspx?direct=true&db=edseee&AN=edseee.8324593&site=eds-live&scope=site.

[20] Sandler, M., A. Howard, M. Zhu, A. Zhmoginov, and L.-C. Chen. MobileNetV2: Inverted Residuals and Linear Bottlenecks. 2018. https://doi.org/10.1134/50001434607010294.

[21] LaLonde, R., and U. Bagci. Capsules for Object Segmentation. No. Midl, 2018, pp. 1-9.

[22] Badrinarayanan, V., A. Kendall, and R. Cipolla. SegNet: A Deep Convolutional Encoder-Decoder Architecture for Image Segmentation. IEEE Transactions on Pattern Analysis and Machine Intelligence, Vol. 39, No. 12, 2017, pp. 2481-2495. https://doi.org/10.1109/TPAMI.2016.2644615.

[23] Hill, M. Overview of Human-Computer Collaboration. Vol. 8, No. June, 1995, pp. 67-81.

[24] Chen, S., L. Liang, W. Liang, and H. Foroosh. 3D Pose Tracking with Multitemplate Warping and SIFT Correspondences. IEEE Transactions on Circuits and Systems for Video Technology, Vol. 26, No. 11, 2016, pp. 2043-2055. https://doi.org/10.1109/TCSVT.2015.2452782.

[25] Marchand, E., H. Uchiyama, F. Spindler, E. Marchand, H. Uchiyama, and F. Spindler. Pose Estimation for Augmented Reality: A Hands-on Survey Pose Estimation for Augmented Reality: A Hands-on Survey. Vol. 22, No. 12, 2016, pp. 2633-2651. https://doi.org/10.1109/TVCG.2015.2513408.

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A method of calculating a likelihood of a defect within a captured image of a structure using a hybrid system, the method comprising the steps of:
- scanning an area surrounding a mixed reality headset to capture one or more images including possible defects;
- suggesting, via the mixed reality headset, an area within the captured one or more images for an analysis;
- receiving, via a user-input actuator in communication with the mixed reality headset, an input from a user to investigate the area;
- capturing, via the mixed reality headset, an image of the area;
- generating, via the mixed reality headset, a bounding box surrounding the image of the area, the bounding box including a plurality of boundaries;
- projecting, via the mixed reality headset, an object onto the bounding box surrounding the image of the area;
- transmitting, via the mixed reality headset, the bounding box surrounding the image of the area and the projected object to a server;
- segmenting, via the server, the image within the bounding box by creating a plurality of prediction vectors within the image;
- comparing, via the server, the segmented image with a plurality of images from a trained data set by comparing the plurality of prediction vectors and the projected object to the trained data set;
- calculating, via the server, a likelihood of a defect within the segmented image based on the comparison with the trained data set; and
- transmitting, via the server, the calculated likelihood of the defect to the mixed reality headset.

2. The method of claim 1, further comprising the step of, after generating the bounding box surrounding the image of the area, receiving, via the user-input actuator, an input from the user confirming a placement and size of the bounding box.

3. The method of claim 1, wherein the step of generating the bounding box further comprises modifying a boundary of the bounding box based on a user input.

4. The method of claim 1, further comprising the step of assigning, via the mixed reality headset, a prediction threshold to the captured image of the area, wherein the prediction threshold determines at least one of the plurality of boundaries of the bounding box.

5. The method of claim 1, further comprising the step of altering the prediction threshold.

6. The method of claim 1, wherein a higher prediction threshold alters at least one of the plurality of boundaries of the bounding box to reduce an area of the bounding box, and wherein a lower prediction threshold alters at least one of the plurality of boundaries of the bounding box to increase an area of the bounding box.

* * * * *